United States Patent
Conover (10) Patent No.: US 6,832,772 B2
(45) Date of Patent: Dec. 21, 2004

(54) VEHICLE CENTER SECTION ADJUSTABLE ANTI-ROLL BAR

(75) Inventor: Steven G. Conover, El Dorado Hills, CA (US)

(73) Assignee: Peterson & Erb, El Dorado Hills, CA (US)

(*) Notice: Subject to any disclaimer, the term of this patent is extended or adjusted under 35 U.S.C. 154(b) by 121 days.

(21) Appl. No.: 10/267,240

(22) Filed: Oct. 8, 2002

(65) Prior Publication Data

US 2003/0080526 A1 May 1, 2003

Related U.S. Application Data

(60) Provisional application No. 60/348,330, filed on Oct. 26, 2001.

(51) Int. Cl.[7] ........................... B60G 21/05; B60G 11/18
(52) U.S. Cl. ........................... 280/124.106; 280/124.166
(58) Field of Search ................... 280/124.106, 124.166, 280/124.152

(56) References Cited

U.S. PATENT DOCUMENTS

| | | | |
|---|---|---|---|
| 2,497,072 A | * | 2/1950 | Cooper ................ 280/124.166 |
| 4,234,205 A | | 11/1980 | Thiesce |
| 4,491,342 A | | 1/1985 | Aubry |
| 4,544,180 A | | 10/1985 | Maru et al. |
| 4,621,831 A | | 11/1986 | Takadera et al. |
| 4,625,995 A | * | 12/1986 | Aubry et al. ......... 280/124.166 |
| 4,637,628 A | | 1/1987 | Perkins |
| 4,648,620 A | | 3/1987 | Nuss |
| 4,863,148 A | * | 9/1989 | Hufnagel ............. 280/124.166 |
| 5,378,010 A | * | 1/1995 | Marino et al. ........ 280/124.107 |
| 5,632,502 A | | 5/1997 | Oppitz et al. |
| 5,826,687 A | | 10/1998 | Bungeler et al. |
| 6,145,858 A | * | 11/2000 | Foulquier ............. 280/124.13 |
| 6,311,811 B1 | | 11/2001 | Jung |
| 6,447,073 B1 | * | 9/2002 | Goettker ..................... 301/127 |

* cited by examiner

Primary Examiner—Paul N. Dickson
Assistant Examiner—Joselynn Y Sliteris
(74) Attorney, Agent, or Firm—Joseph E. Mueth (57) ABSTRACT

An adjustable anti-roll bar having a single set of mounting apertures whose roll rate is adjusted in the middle of the anti-roll bar. The roll rate is determined by the location of the junction of one torsion member to another; that is, an outer torsion member to an inner torsion member. In order to account for the presence of certain automotive components in the undercarriage area, the geometry of the anti-roll bar may be changed. The second embodiment meets this challenge for a specific vehicle by using two weldments of a specific size to relocate the adjustable middle section. Changing the length and angle of the lever arms of the first embodiment can do the same thing in many instances.

13 Claims, 11 Drawing Sheets

FIG. 1

PRIOR ART

FIG. 2

PRIOR ART

SECTION A-A

SECTION B-B

FIG.11

VEHICLE CENTER SECTION ADJUSTABLE ANTI-ROLL BAR

This patent application claims the benefit of Provisional Patent Application No. 60/348,330, filed Oct. 26, 2001.

FIELD OF THE INVENTION

This invention pertains to an adjustable anti-roll bar, often called an anti-sway bar, used in conjunction with the suspension of "street" and racing cars.

BACKGROUND OF THE INVENTION

Anti-roll bars are used in vehicles to adjust the torque of the suspension, whereby the roll rate can be influenced. Anti-roll bars are typically torsional springs which act across one axle to introduce resistance to relative changes in displacement of one wheel on that specific axle compared to the displacement of the other wheel on the same axle. The torsion spring is constrained both radially and axially and is connected to the suspension member in motion by a lever arm and a linkage. Taken together the lever arm and linkage is referred to in the art as a drop link.

The spring rate of an anti-roll bar may be fixed, that is non-adjustable and is determined by the dimensions of the anti-roll bar. Such anti-roll bars are known to the prior art. In addition, adjustable spring rates can be obtained by using a fixed dimension anti-roll apparatus having a plurality of aligned mounting hole pairs for attachment of the drop link. The chosen pair of mounting holes creates a change in length of the lever arm acting on the torsional spring. These also are known in the art. The change to the torsional spring rate of a vehicle having an anti-roll bar by any mode gives rise to what is termed a change to the roll stiffness of the vehicle.

Roll stiffness is important to both the ride comfort and the cornering ability of vehicles. Too little roll stiffness results in excess body lean and a slow response to changes of the steering wheel by the driver. On the other hand, too much roll stiffness creates a jittery uncomfortable ride which can cause a sudden loss of traction and the ability of the tires to stick to the road during cornering maneuvers.

The suspension and the anti-roll bar combination are predefined to give the vehicle certain riding characteristics. Thus, most vehicles are factory set to provide a roll stiffness balance to satisfy average usage, road conditions and driver preferences. This setting is commonly referred to as a "tuned suspension".

However, not all drivers are satisfied with the factory chosen specification. Indeed independent roll stiffness adjustments at the front and rear axles of a vehicle are often desired to balance the front and rear cornering adhesion limits for either safety or speed.

Many drivers desire to use a vehicle under conditions that deviate from the average daily driving conditions. Sometimes a driver may desire more vehicle feel and balance during driving. Contrast the handling of any given stock Chevrolet® with any given BMW®.

Several instances of the desire to deviate from the norm can be mentioned. In the case of cars and trucks driven on smoother well maintained road surfaces or with tire and road interfaces having high adhesion, a maximum of roll stiffness would be desired. Vehicles driven in very wet climates, or on rough roads or dirty roads such as in under-developed countries are better suited to a softer stiffness for both comfort and driving security.

Race car drivers may desire a softer or a firmer suspension to achieve superior cornering of the vehicle. The nature of the track dictates the nature of the desired roll rate. Some of the influencing factors include the nature of the asphalt, wetness on the surface, dirt on the surface, and ambient temperature. If the track has low adhesion on a particular day, say, due to heavy rain, then to achieve maximum cornering the driver will desire a soft roll rate. But if the track has a high adhesion level, then a higher stiffness of the anti-roll bar is indicated in order to achieve maximum cornering capability of the vehicle.

Thus, the desire to be able to modify the roll rate of a vehicle can be readily understood. Heretofore, in order to make a change in roll stiffness, the driver either changed out the single hole mount sway bar, or used a flange adjustable sway bar or anti-roll bar. The prior art flange adjustable sway bars available in the marketplace use a bar of a specific configuration suitable to the car in question, with a mounting flange at each end, wherein the flange instead of having one mounting aperture has a series of usually up to three aligned apertures for mounting. The chosen mounting aperture dictates the nature of the roll rate as the torque is influenced directly by the flange aperture used in the mounting of the bar. It is believed that no one has previously devised an anti-roll, bar or sway bar that is adjustable across the middle of the bar as opposed to being adjustable at the mounting flanges.

According to the present invention, an anti-roll bar is provided wherein the active length of concentric central torsion springs can be readily varied. Such design capability is highly desired due to the fact that in many of today's highly sophisticated automobiles, there is little or no room for the extra long flanges associated with the prior art adjustable drop link anti-roll bars to be able to change their position when and as the driver desires. Thus, the need for an apparatus having the features of the several embodiments of this invention can be readily seen.

SUMMARY OF THE INVENTION

Briefly, the invention comprehends an adjustable anti-roll bar comprising two elongated torsion members, one a hollow outer member, the other an inner member snugly received in the outer member, said members having a series of aligned diametrical openings at spaced intervals along their length, means at the end of said outer member for connection to one lever arm of a conventional vehicle suspension system and means at the end of said inner member for connecting to the other lever arm of a conventional vehicle suspension system, and fastening means inserted in any selected one of said series of diametrical openings to connect said inner and outer members whereby the stiffness of said anti-roll bar is determined.

It is a object therefore of this invention to provide an adjustable anti-roll bar that is adjusted by the proper placement of one or more fasteners.

It is a second object to provide two embodiments of this invention, both of which use the same concept for operation, but one of which utilizes a pair of opposed weldments to which the concentric members are attached in order to change the geometry to avoid interference with other car parts on the vehicle chassis.

Other objects of the invention will in part be apparent and will in part appear hereinafter.

The invention accordingly comprises the device possessing the features properties and the relation of components which are exemplified in the following detailed disclosure. For a fuller understanding of the nature and objects of the invention, reference should be made to the following description, taken in conjunction with the accompanying drawings.

THE DRAWINGS

Turning to the drawings.

DESCRIPTION OF THE PREFERRED EMBODIMENTS

Figure 2:
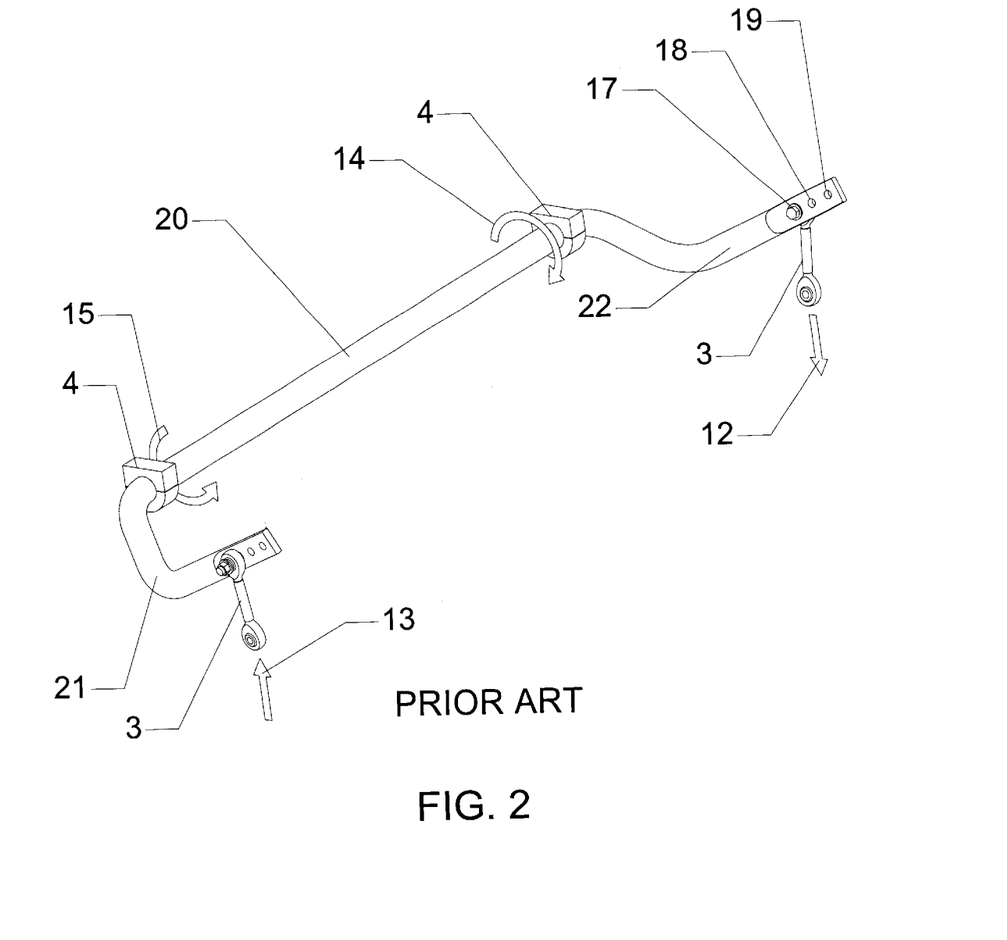
FIG. 2 is a perspective view of a common type of prior art anti-roll bar in the stiffest setting.
Figure 3:
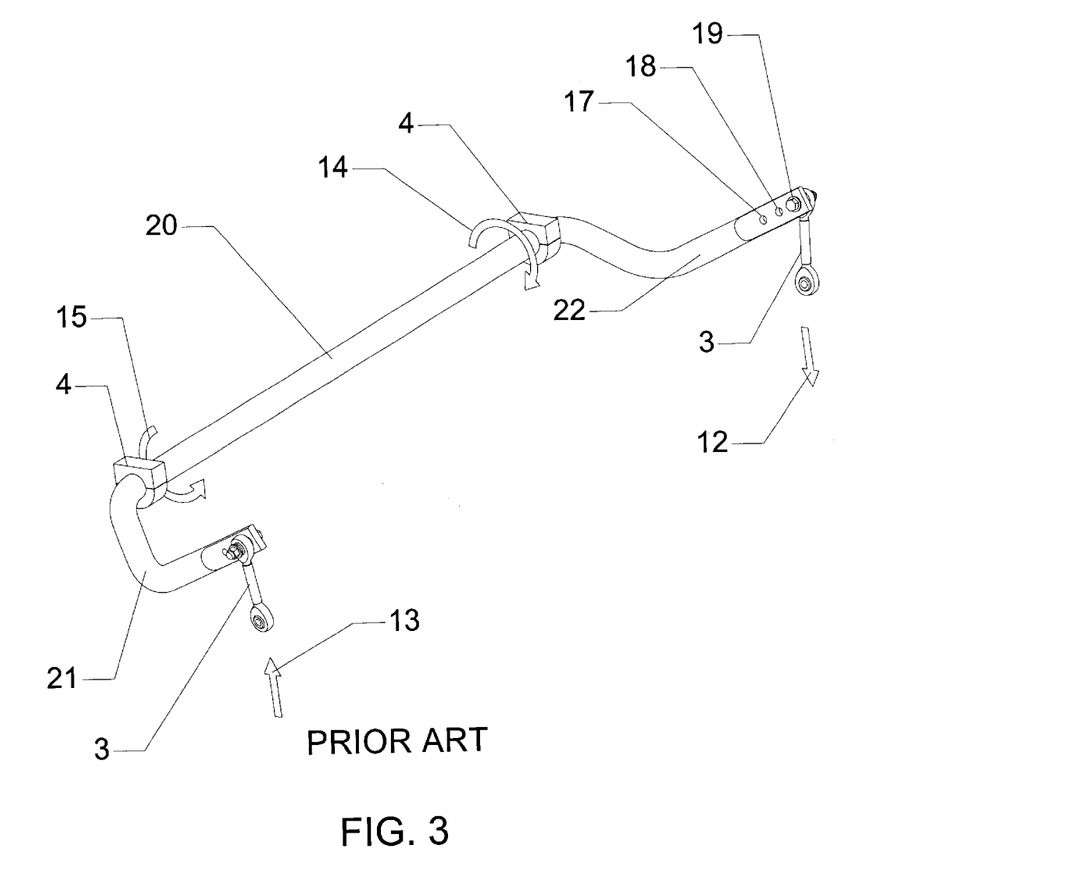
FIG. 3 is a perspective view of the prior art anti-roll bar of FIG. 2 in the softest setting.

Turning to the drawings in greater detail, FIGS. 1 and 4 to 8 show one preferred embodiment of the anti-roll bar of the invention. FIGS. 2 and 3 show a typical prior art anti-roll bar. Where parts are common in the prior art and the invention, the same reference numerals are used.

Figure 5:
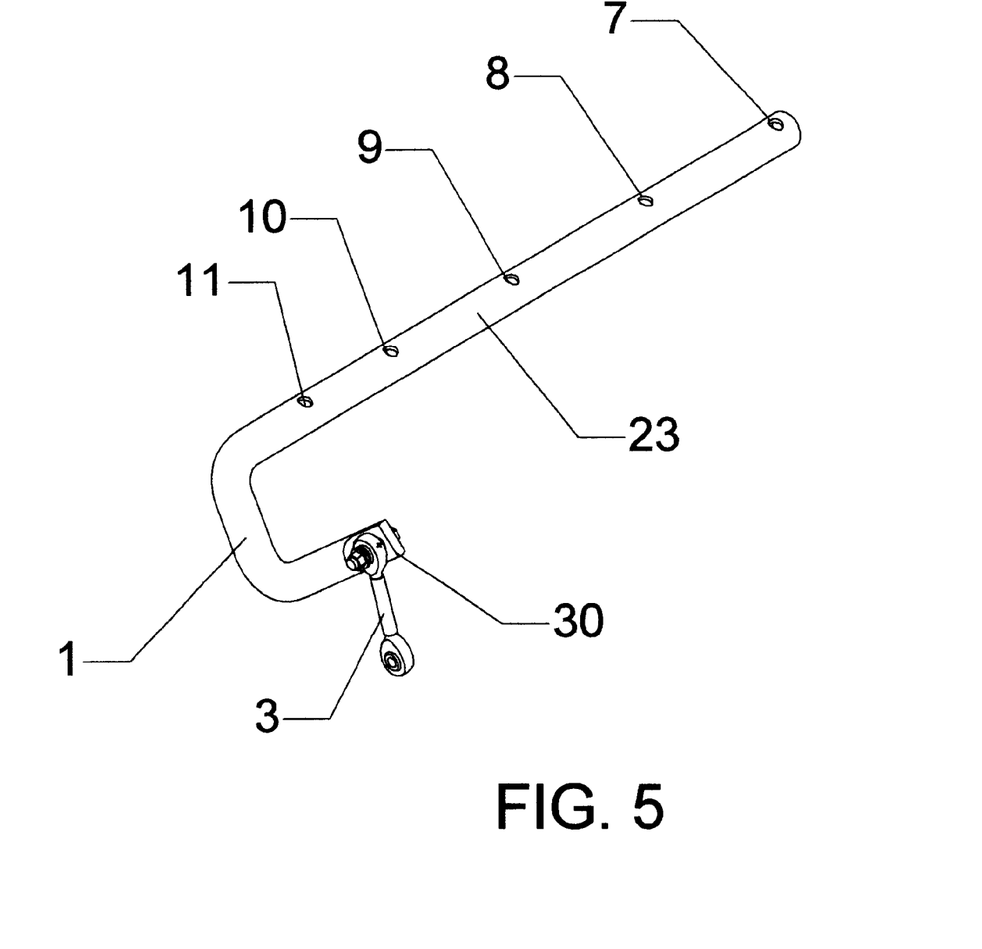
FIG. 5 is a perspective view of the lever arm, suspension link and center inner torsion member of the first embodiment of this invention.

Outer elongated torsion member or tube 5 is a hollow steel cylinder which is welded by weldment 24 to one end of lever arm 2. The inner elongated torsion member 23 is a hollow tubular steel member integrally formed with lever arm 1, as is best shown in FIG. 5. The linear portion of inner member 23 is snugly and coaxiically received within the outer member 5.

Arms 1 and 2 are each connected to suspension links 3 to form "drop links". Suspension links 3 are connected at their free ends to the vehicle in conventional manner.

The entire anti-roll bar assembly shown in FIGS. 1 and 4 to 8, is carried by pivot blocks 4. The torsion member are rotatable in pivot blocks 4.

At points 7, 8, 9, 10 and 11 there are diametrical openings in the form of holes or openings running through opposed walls of both outer elongated torsion member 5 and inner elongated torsion member 23. These openings at points 7, 8, 9, 10 and 11 are carefully aligned so as to be able to receive a bolt, nut and washer assembly 6 there-through. The location of the openings at spaced intervals and the selection of the particular location of the bolt, nut and washer assembly 6 determines the stiffness or roll rate characteristics of the anti-roll bar. If assembly 6 is at point 7, the anti-roll bar is least stiff, i.e., at the softest position. Points 8, 9 and 10 present intermediate stiffness adjustments with the stiffness of the anti-roll bar progressively increasing as the assembly 6 is moved from point 7, to point 8, then to 9 and on to point 10. With assembly 6, point 11 provides the stiffest position.

Figure 1:
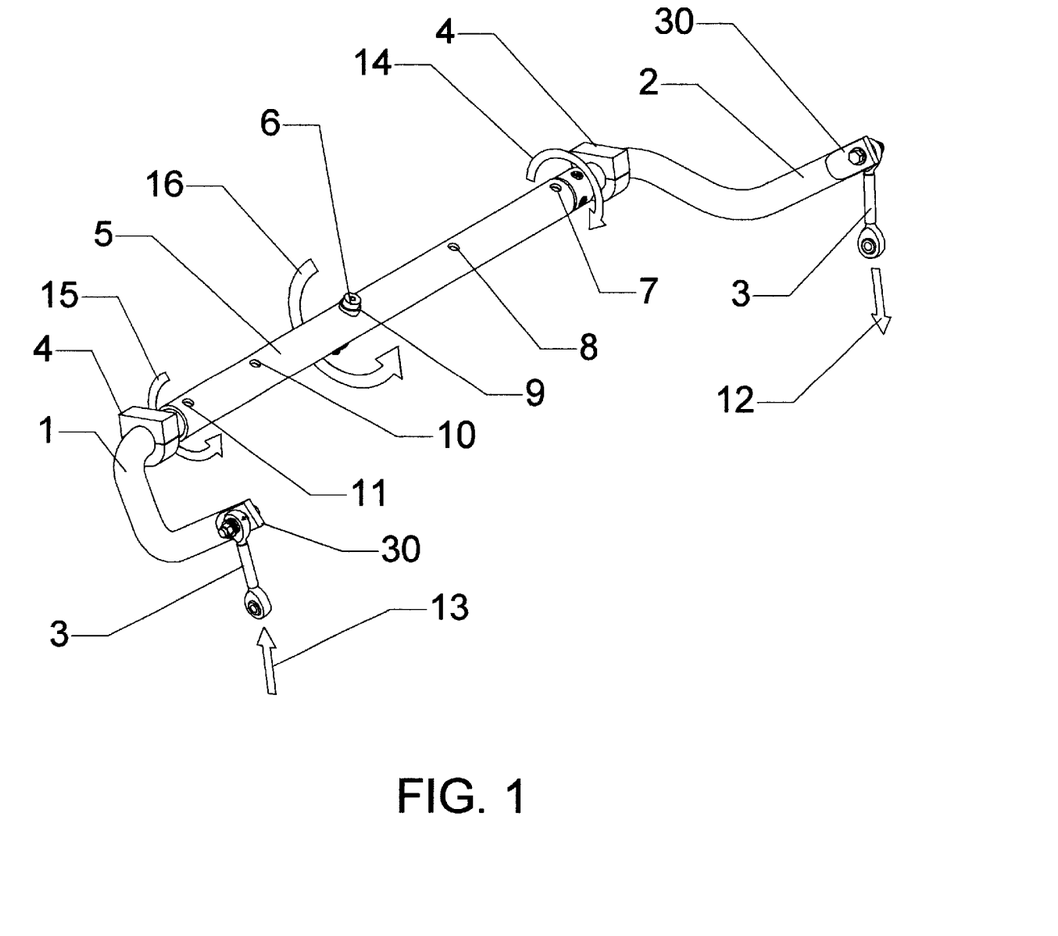
FIG. 1 is a perspective view of the first preferred embodiment of the adjustable anti-roll bar of this invention in the intermediate setting.

In FIG. 1, with the bolt in the 9 position, ½ of the twist resistance of the softer (inner) member 23 and ½ of the twist resistance of the stiffer (outer) spring or member 5 is used. With the bolt in the 7 position, soft adjustment, all of the twisting goes through the softer inner spring (member 23), and the outer one (member 5) rotates freely at its connected end. With the bolt in the 11 position, stiffest adjustment, the entire length of both members 5 and 23 are constrained to rotate in unison.

The first embodiment employs a tubular inner torsion member 23 which is welded to or is integrally formed with one of the lever arms, here shown in FIG. 5 as part of the left arm 1. Each of the left and right lever arms of both embodiments of the invention include a flattened or flange section 30 having but one aperture. In this aspect alone, the devices of this invention are similar to the prior art nonadjustable anti-roll bars of FIGS. 2 and 3. The one piece prior art adjustable anti-roll bar of FIGS. 2 and 3 has a plurality of aperture locations for mounting within the flanges of the two lever arms.

In the prior art it of FIGS. 2 and 3, it should be noted that center torsion member 20 is in the form of a single unitary piece and has no center adjustment. The only adjustment is provided at the distal ends of lever arms 21 and 22 in the form of holes 17, 18 and 19. The stiffness characteristics of torsion member 20 can be changed only by switching the fastener location from one hole to another among holes 17, 18 and 19.

Figure 4:
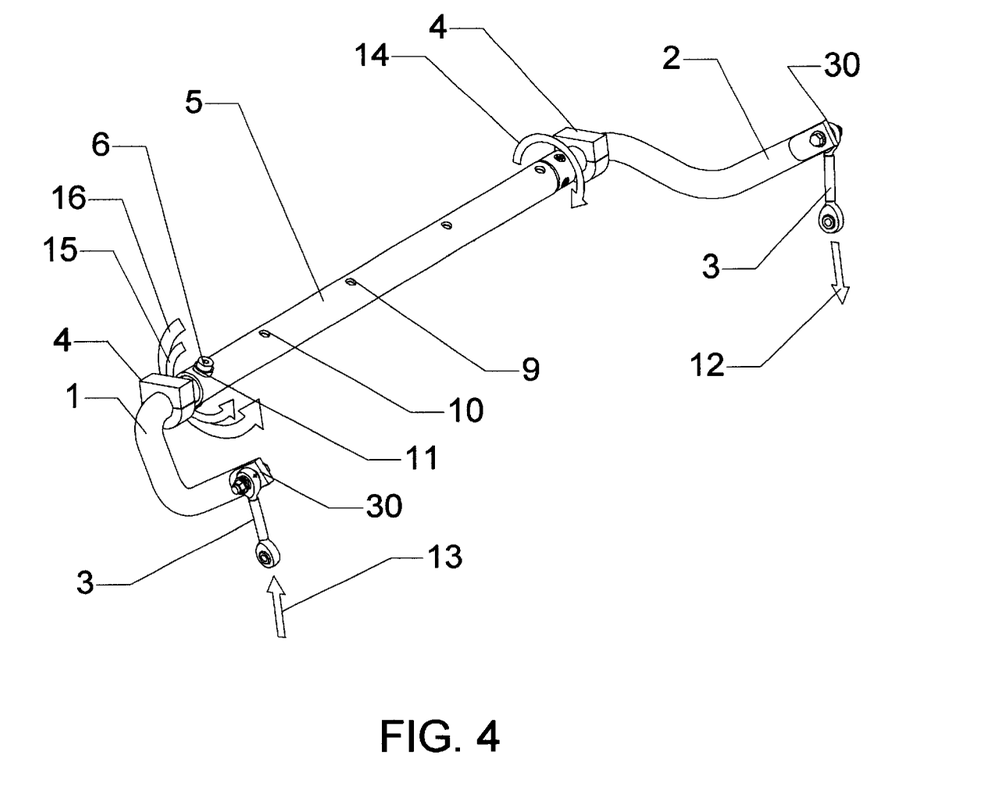
FIG. 4 is a perspective view of the adjustable anti-roll bar in a stiffer setting then in FIG. 1.
Figure 6:
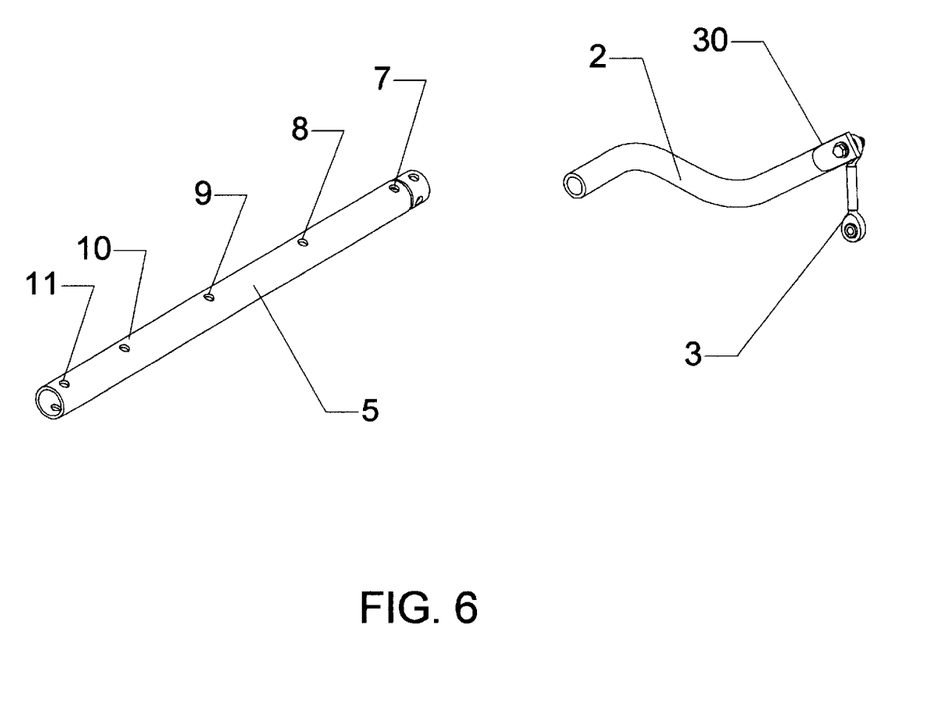
FIG. 6 is a perspective and exploded view of the opposite end lever arm and suspension link, and the outer torsion tube of the first embodiment of this invention.
Figure 7:
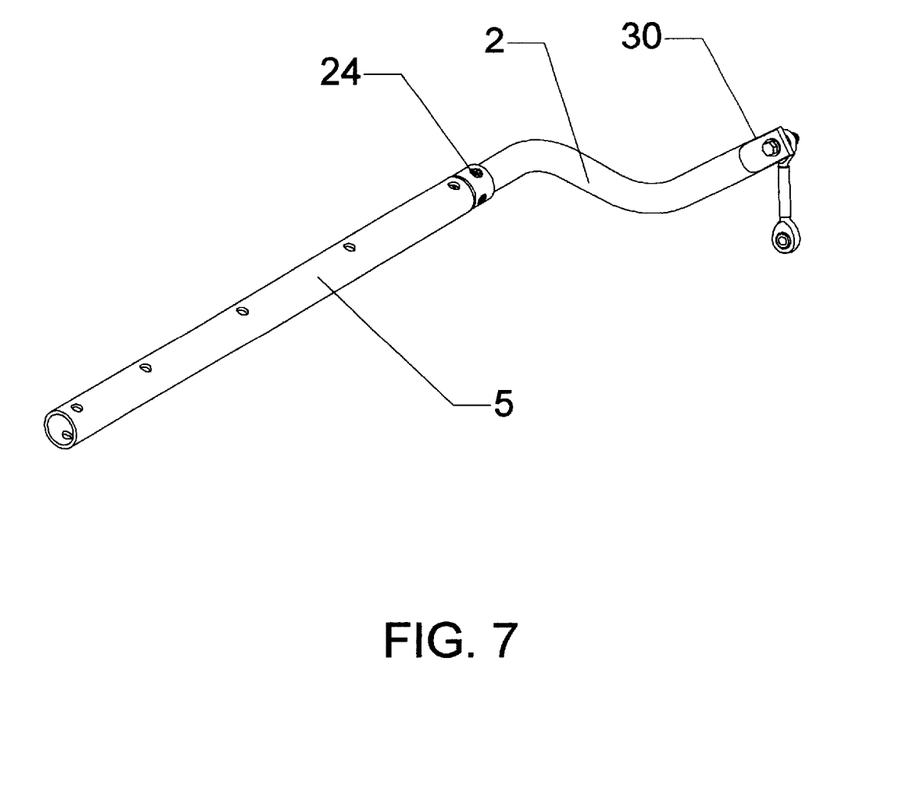
FIG. 7 is a perspective view showing the elements of FIG. 6 in assembled form.

In FIG. 6, the outer tubular torsion member 5 is seen to be welded to the right arm 2. The left arm 1 to which is integrally formed the inner torsion member 23 is also tubular. A suitable cross section for the inner torsion member 23 is 1.250 inches and for the outer torsion member 5 is 1.625 inches. While the spacing of the apertures in each tube are shown to be uniformly spaced, they need not be so. The apertures of the inner and outer tubes must be aligned when the inner torsion tube 23 is inserted into the outer torsion tube 5, as per FIGS. 1 and 4. In FIGS. 1 and 4, the outer and stiffer torsion tube is rigidly connected to one of the lever arms, while the other spring, the inner and softer torsional spring is connected to the other lever arm. Preferably, the two torsional springs fit coaxially and are coupled together by varying the combinations and locations of a pin or bolt (with a nut) that induces the two springs to rotate in the same increment at the respective junction or fastening location.

Arrows 12 and 13 indicate the suspension displacement and arrows 14, 15 and 16 the rotational displacement as force is applied to the anti-roll bar.

In the first preferred embodiment, the inner torsion member 23 may be tubular or solid.

Figure 9:
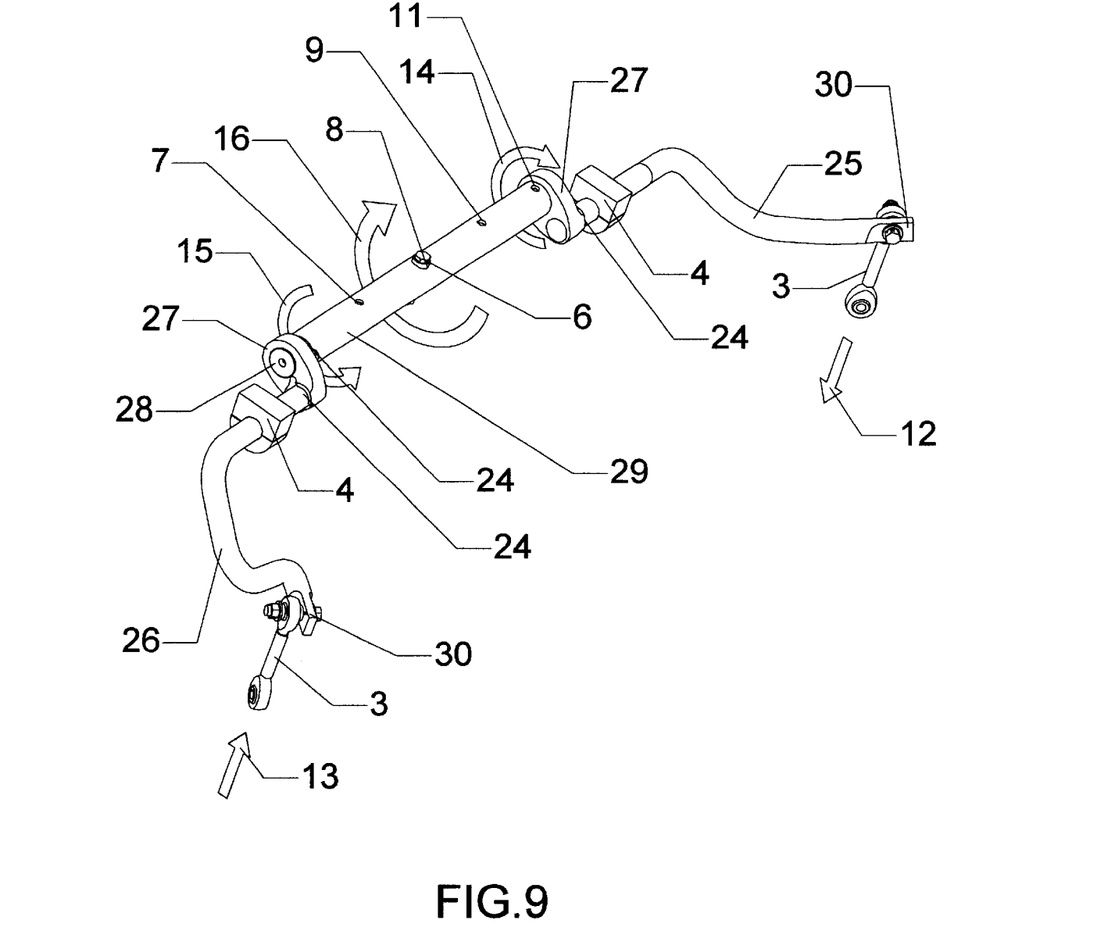
FIG. 9 shows the adjustable anti-roll bar of the second embodiment of this invention in the assembled state with the bar in the intermediate setting.
Figure 10:
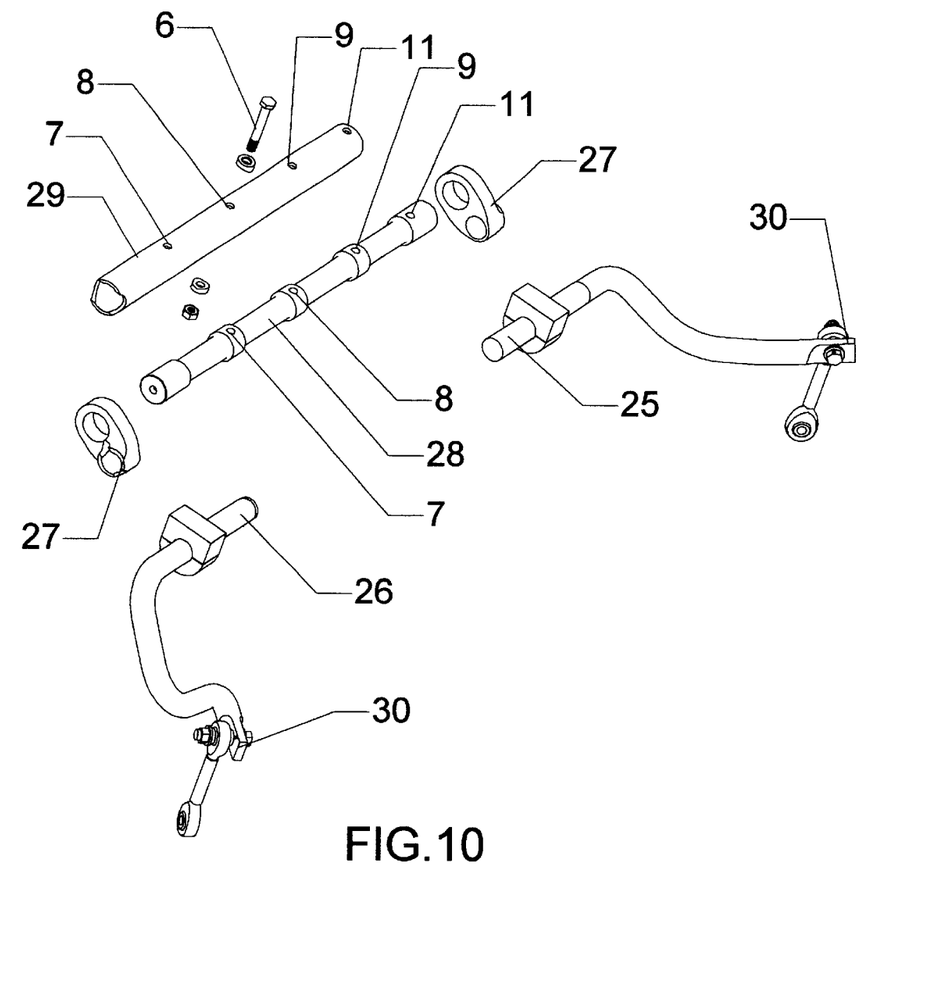
FIG. 10 is a fully exploded view of an alternate or second preferred embodiment of the adjustable anti-roll bar of this invention.
Figure 11:
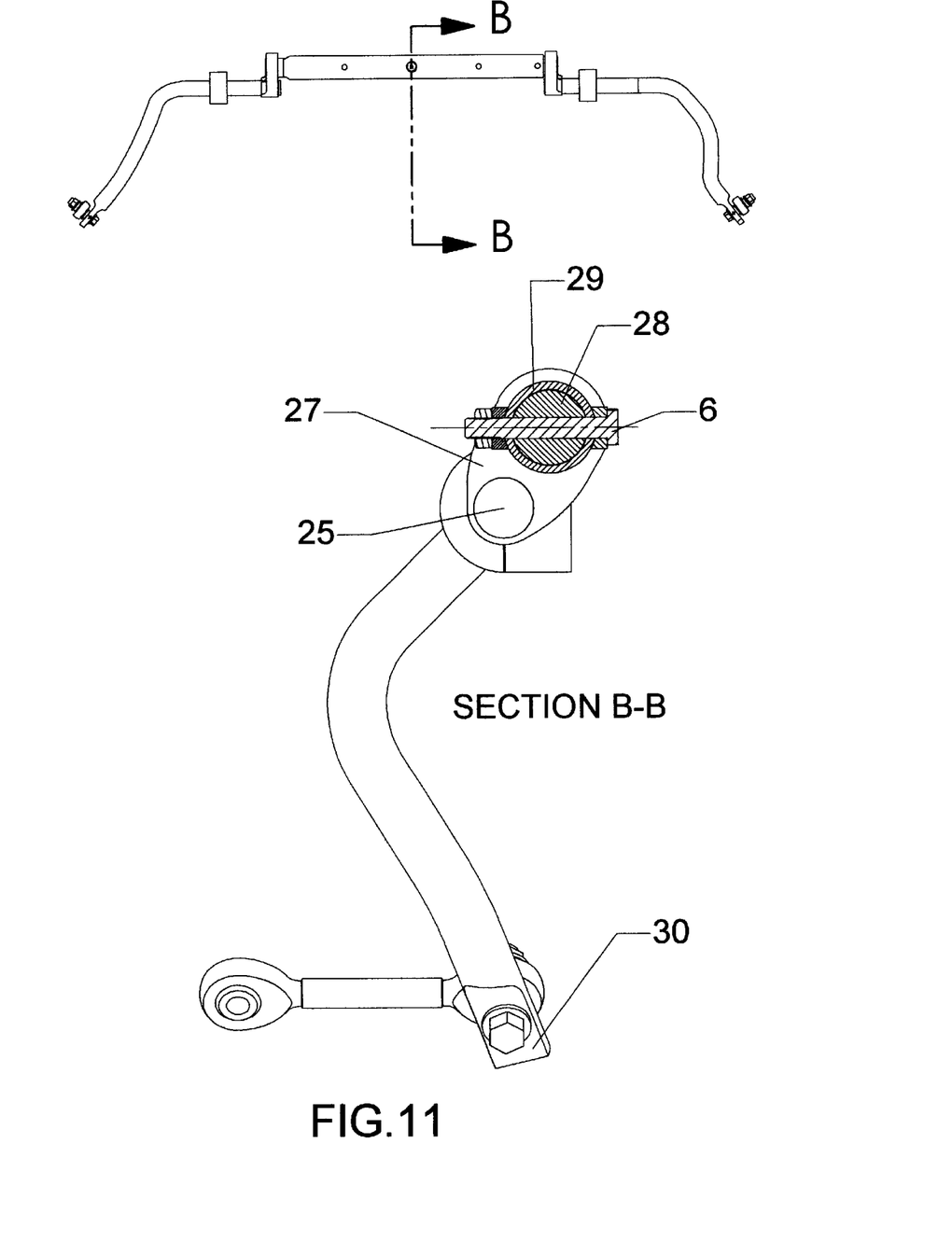
FIG. 11 shows at the top a plan view of an assembled view of the alternate embodiment of FIG. 10 and a sectional view taken along the line B—B.

The second preferred embodiment of the invention is shown by the anti-roll bar assembly of FIGS. 9-11. To the extent the elements of the first and second embodiments of this invention are the same, the same numbering is maintained.

In the second embodiment, the inner or central elongated torsion member 28 and outer elongated torsion member 29 differ from the first embodiment in that these elements as used with offset connectors 27, and the lever arms 25 and 26, while conventional, are somewhat different in shape from the lever arms of the first embodiment, as is apparent from the drawings. The adjustment of the stiffness by insertion of the bolt, nut and washer assembly 6 into one of the aligned openings 7, 8, 9, 11 is the same as in the first embodiment. In the second embodiment, the one offset connector 27 is rigidly welded to arm 25 at one side, and the other offset connector 27 is rigidly welded to arm 26 at the other side. At the right side of the anti-roll bar, as depicted in FIGS. 9-11, inner or central elongated solid torsion member 28 is welded to offset connector 27, while the outer elongated tubular torsion member 29 is not welded at its right end to offset connector 27 or to inner elongated torsion member 28. At the left side of FIGS. 9-11, offset connector 27 is rigidly welded to lever arm 26 and inner elongated torsion member 28 is welded to offset connector 27. At the left side of FIGS. 9-11, and the outer elongated torsion member 29 is welded to either inner elongated torsion member 28 or offset connector 27, or to both of these elements, thereby permanently joining the inner and outer torsion members at that end of the assembly.

FIG. 10 depicts the second embodiment in exploded view. It shows the connection bolt and nut 6. Note however that while the inner concentric torsion member 28, the lower of the two elongated members is here seen to be a solid member, it could also be tubular. For the second preferred embodiment, the nut passes through a first washer then through the outer tube 29 (the upper one depicted), then through the solid inner member 28, then through the outer tube 29 and a second washer to be secured by the nut.

In FIG. 11, the second embodiment of this invention is seen in a plan and sectional views. It is comprised of two opposed mirror image arm portions, each of which has a flange 30 with a single mounting aperture located at a first end thereof which is the distal end. The other or proximal end of each of the lever arms 25 and 26 has a weldment attached thereto in the form of connector 27 which has two tubular receiving sections therein. The lower and smaller of these is for the respective lever arm, preferably of a diameter of 1.25 inches of steel.

The term "means" at the end of a member "for connection to a lever arm" in the case of the first embodiment refers to either an integral connection between the inner torsion member 23 and the lever arm 1 or a weldment connection of the outer torsion member 5 to its associated lever arm 2. In the second embodiment, this term refers to the offset connector 27 each of which is welded to its associated lever arm and to the weldment between each end of inner torsion member 28 and adjacent the offset connectors 27.

While the inventive concept expressed in these two embodiments; namely to have the adjustability of the anti-roll bar located in the middle of the bar, can be employed with almost any vehicle, it is to be understood that the first embodiment as depicted here is specifically intended for a model year 2001 Honda S-2000 while the second embodiment is intended specifically for an Acura RSX.

Figure 8:
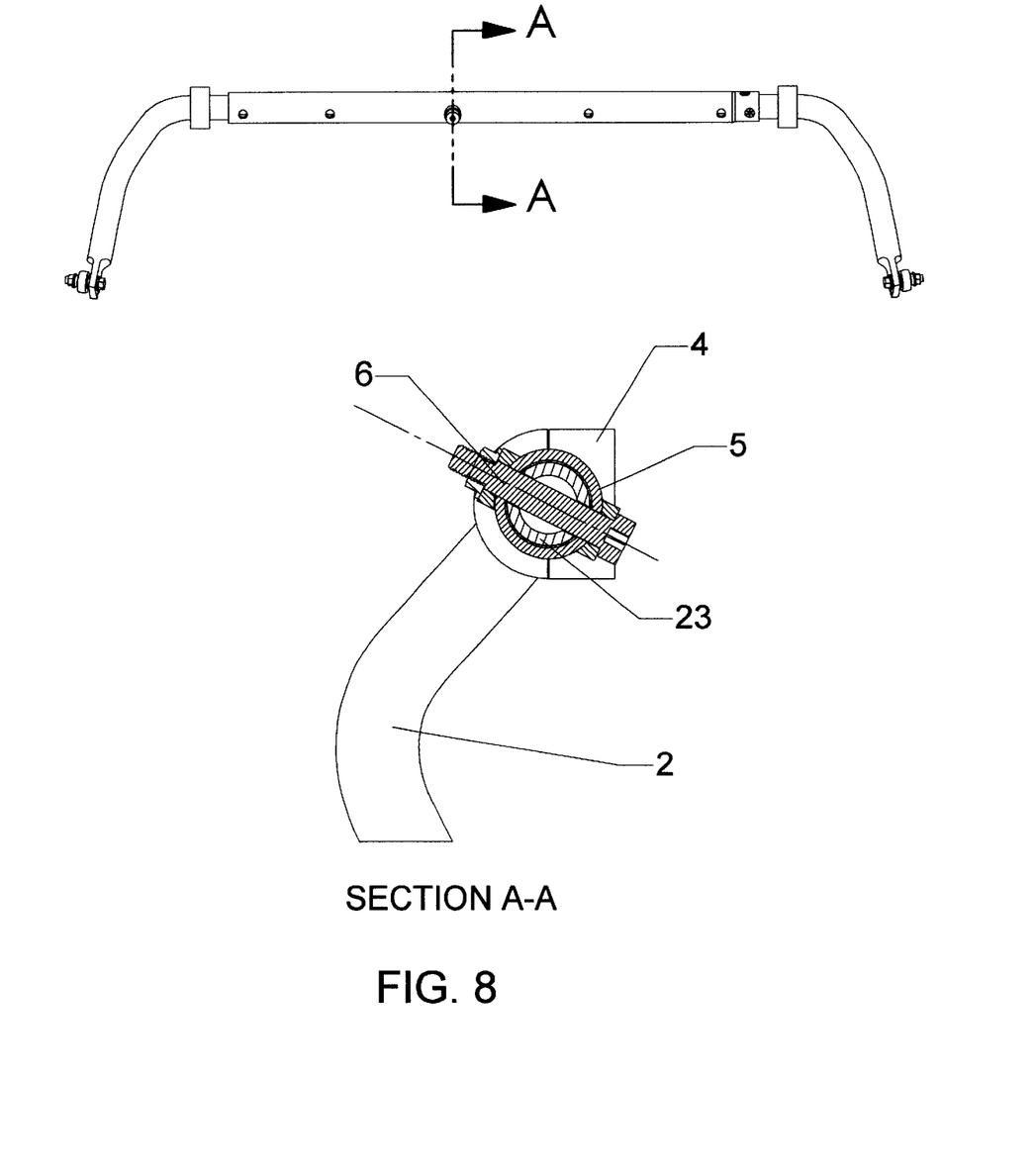
FIG. 8 shows at the top a plan view of the adjustable anti-roll bar of the first embodiment of this invention in the assembled state together with a section taken along line A—A.

The use of additional (multiple) pins or bolts or other fasteners at various locations along the aligned openings, will achieve different torsional rates. It is preferred, as shown in FIG. 8, that assembly 6 includes a pin or bolt that completely passes through the inner and outer torsion members and is held by a nut or other retainer.

The weldments may be configured as may be needed to permit the adjustable middle concentric members to be located out of the way of certain car components in the undercarriage area. If one were to alter the length and angle of the lever arms of the first embodiment it is also possible to relocate this less complex embodiment to be out of the way of other automobile components present in the undercarriage area.

In the discussion above, circular solid and tubular members are discussed as being preferred. Equal sided square, hexagonal and hexagonal and other even number of sides configurations may also be employed.

Since certain changes may be made in the described apparatus without departing from the scope of the invention herein involved, it is intended that all matter contained in the above description and shown in the accompanying drawings shall be interpreted as illustrative and not in a limiting sense.

Having fully described the invention, the following claims are intended to particularly point out and distinctly claim the invention.

1. An adjustable anti-roll bar comprising two elongated torsion members, one a hollow outer member, the other an inner member snugly received in the outer member, said members having a series of aligned diametrical openings at spaced intervals along their length, means at the end of said outer member for connection to one lever arm of a conventional vehicle suspension system and means at the end of said inner member for connecting to the other lever arm of a conventional vehicle suspension system, and fastening means inserted in any selected one of said series of diametrical openings to connect said inner and outer members whereby the stiffness of said anti-roll bar is determined.

2. The anti-roll bar of claim 1 wherein said inner and outer torsion members are permanently joined together at one of their ends.

3. The anti-roll bar of claim 1 wherein each of said means for connecting provides a rigid connection between said torsion member and said lever arm.

4. The anti-roll bar of claim 1 or 2 wherein each of said torsion members is circular in cross-section and the inner torsion member is coaxially received in said outer torsion member.

5. The anti-roll bar of claim 1 or 2 wherein the diametrical openings are at uniform spaced intervals.

6. The anti-roll bar of claim 1 or 2 wherein each of said torsion members is hollow.

7. The anti-roll bar of claim 1 or 2 wherein said inner torsion member is solid.

8. The anti-roll bar of claim 2 wherein said inner and outer torsion members are welded at one of their ends.

9. The anti-roll bar of claim 2 wherein said outer member is welded at one end to said means for connecting to one said lever arm.

10. The anti-roll bar of claim 6 wherein the wall thickness of the inner member is greater than the wall thickness of the outer member.

11. The anti-roll bar of claim 1 or 2 wherein said torsion members are steel.

12. The anti-roll bar of claims 1 and 2 wherein each of said lever arms is connected to a linkage to form a drop link.

13. The anti-roll bar of claim 2 wherein each of said means for connecting includes an offset connector, each of which is welded to the lever arm, and weldments between each end of said inner torsion member and the offset connectors.

* * * * *